United States Patent [19]

Jacus et al.

[11] Patent Number: 5,462,819
[45] Date of Patent: Oct. 31, 1995

[54] RECHARGEABLE ALKALINE ROUND CELL HAVING HOT MELT BARRIER

[75] Inventors: Robert J. Jacus, Madison; James A. Senn, Platteville; Kenneth R. Kusel, Dodgeville, all of Wis.

[73] Assignee: Rayovac Corporation, Madison, Wis.

[21] Appl. No.: 257,569

[22] Filed: Jun. 10, 1994

Related U.S. Application Data

[63] Continuation-in-part of Ser. No. 968,896, Oct. 30, 1992, Pat. No. 5,324,332.

[51] Int. Cl.$^6$ .................................................. H01M 2/16
[52] U.S. Cl. ........................ 429/174; 429/171; 429/185; 429/184
[58] Field of Search .................... 429/171, 174, 429/185, 184

[56] References Cited

U.S. PATENT DOCUMENTS

| | | | |
|---|---|---|---|
| 1,370,054 | 3/1921 | Schulte . | |
| 2,389,674 | 11/1945 | MacFarland | 136/175 |
| 2,605,298 | 7/1952 | Marsal | 136/107 |
| 3,318,737 | 5/1967 | Watanabe et al. | 136/133 |
| 3,364,073 | 1/1968 | Balaguer | 136/107 |
| 3,617,384 | 11/1971 | Kamai et al. | 136/30 |
| 3,740,271 | 6/1973 | Jammet et al. | 136/107 |
| 4,037,030 | 7/1977 | Sabatino | 429/139 |
| 4,075,398 | 2/1978 | Levy | 429/56 |
| 4,174,565 | 11/1979 | Kordesch | 29/623.2 |
| 4,320,182 | 3/1982 | Sugalski | 429/94 |
| 4,515,187 | 5/1985 | Schaumburg et al. | 141/1 |
| 4,618,547 | 10/1986 | Markin | 429/185 X |
| 4,654,963 | 4/1987 | Sugalski | 29/623.1 |
| 4,732,825 | 3/1988 | Kamata et al. | 429/185 X |
| 4,816,355 | 3/1989 | Kulibert et al. | 429/174 |
| 4,857,424 | 8/1989 | Larsen et al. | 429/206 |
| 4,869,978 | 9/1989 | Kubo et al. | 429/185 X |
| 4,957,827 | 9/1990 | Kordesch et al. | 429/60 |
| 5,001,024 | 3/1991 | Eberle | 429/160 |
| 5,108,852 | 4/1992 | Tomantschger et al. | 429/66 |
| 5,272,020 | 12/1993 | Flack | 429/141 |

*Primary Examiner*—Stephen Kalafut
*Assistant Examiner*—Carol Chaney
*Attorney, Agent, or Firm*—Thomas F. Woods; David R. Stiennon

[57] ABSTRACT

During repeated cycling of alkaline manganese dioxide cells, it is critical to ensure that adequate barrier protection is formed and maintained between the anode and cathode of the cell to prevent shorts from occurring between the cathode and anode. However, the potential also exists for anodic zinc to migrate via the absorbent separator and create a short path to the cathode. To prevent this, cells are fabricated wherein a separator is placed into the cells, a hot melt material is metered into the cell so that the hot melted material flows under the bottom edge of the separator, which is then pushed down and seated in the hot melt material as it cools. The end result is a barrier which is forms at the bottom of the cell and at both sides of the separator and virtually eliminates shorts from developing between the electrodes.

5 Claims, 5 Drawing Sheets

RECHARGEABLE ALKALINE ROUND CELL HAVING HOT MELT BARRIER

RELATED APPLICATION

This application is a continuation in part of U.S. patent application Ser. No. 07/968,896, filed on Oct. 30, 1992, now U.S. Pat. No. 5,324,332.

FIELD OF THE INVENTION

The present invention relates generally to alkaline manganese dioxide cells, and more particularly to rechargeable alkaline zinc manganese dioxide batteries having separator barriers and a meltable sealant between the anode and cathode such that the number of shorts developing between the electrodes of such cells upon repeated charge/discharge cycles is substantially reduced.

BACKGROUND OF THE INVENTION

Alkaline electrochemical cells having zinc anodes and manganese dioxide cathodes have achieved commercial success in recent years. Particularly when manufactured in the cylindrical configuration, such cells constitute important sources of portable electrical energy. Alkaline zinc manganese dioxide cells provide substantially more energy vis-a-vis Leclanche cells when used in high current continuous discharge applications.

Historically, alkaline zinc manganese dioxide cells have been used mainly in primary batteries. To date, significant reductions in battery performance after a few recharge cycles delayed the commercialization of secondary alkaline zinc manganese dioxide cells. Several principal problems contributed to this delay.

One problem endemic to such cells arises from the frequency at which they fail due to shorts developing between the metallic anode and the manganese based cathode. Shorts develop because on repeated discharge anodic zinc tends to migrate towards the cathode. Although the electrodes are separated from one another by a barrier-type separator, pathways may develop between the electrodes. For example, if the physical contact between the separator barrier and the bottom of the cell is disrupted, a short can easily develop.

In prior art cells, the seating of the separator barrier within the cell to reduce shorts between the electrodes in alkaline manganese dioxide cells was accomplished in several ways. U.S. Pat. No. 5,108,852 for a Manganese Dioxide Cathode for a Rechargeable Alkaline Cell and Cell Containing the Same, the disclosure of which is hereby incorporated by reference, discloses one such method. In this method, a plastic disc is placed in the bottom of the cell. Then a convolute separator barrier is placed on the disk and a hot melt material is metered to the inside of the separator barrier. An example of a cell constructed in this way is depicted in FIG. 1. Battery Technologies, Inc. of Richmond Hill, Ontario, Canada has manufactured batteries having such a structure. U.S. Pat. No. 5,272,020 which is incorporated by reference herein, discloses the structure used by the Battery Technologies, Inc. cell and in addition shows the use of a ting on which the separator barrier may be placed. When a ring is used the hot melt glue underlies and overlies the ring bonding the barrier to the ring and the ring to the bottom of the battery can.

During repeat cycling of alkaline manganese dry cells, it is critical to ensure that adequate barrier protection is formed and maintained between the anode and cathode of the cell to prevent shorts from occurring between the cathode and the anode. With the design depicted in FIG. 1, it is possible for anodic zinc to migrate through the absorbent and over the top of the plastic disk thereby creating a shorting pathway to the cathode, as depicted in FIG. 2. Additionally, the manufacture of this type of cell involves additional steps, e.g., the disk must be constructed and then placed within the cell and the cell must be spun during metering of the hot melt. Similarly the ring support shown in U.S. Pat. No. 5,272,020 has a leak path similar to that shown in FIG. 2.

Another method to prevent shorting is taught by Swiss Patent Application No. 669,479. Specifically directed to rechargeable alkaline zinc manganese dioxide cells, this reference utilizes a separator tube as part of a barrier system to prevent an abrupt capacity loss due to shorting experienced in cells after extended cycle life. The Swiss patent teaches three separate approaches, all using a barrier system assembled outside the cell and kept in place in the cell by a hot melt sealant. The first approach involves using a separator tube having only one open end. The closed end of separator tube is affixed to the bottom of the cell with a hot melt sealant. The second approach affixes a separator tube on a plastic disk which is affixed to the bottom of the cell with a hot melt sealant, whereas in the third approach the separator tube is bent inward before being affixed to the plastic disk.

Since the separator tubes disclosed by the Swiss patent all involve completely sealed arrangements, difficulties are encountered in obtaining a sufficient distribution of electrolyte, i.e., the appropriate electrolyte gradient between the electrodes. In order to overcome this problem, several additional manufacturing steps must be taken. Additionally, the insertion of a separator assembly into the cell further reduces the speed in which batteries can be manufactured utilizing the teachings of Swiss Patent Application No. 669,479.

Therefore, an object of the present invention is to provide a rechargeable alkaline manganese dry cell with an insulating barrier at the positive (cathode) end of the cell that completely separates the cathode and anode compartments.

Another object of the present invention is to provide continuous protection against shorting on cycled discharges in rechargeable alkaline manganese dry cells and batteries.

Yet another object of the present invention is to provide rechargeable alkaline manganese dioxide cells and batteries having a simplified overall design.

Still another object of the present invention is to provide rechargeable alkaline manganese dioxide cells and batteries that are easy to manufacture.

Further objects, features, and advantages of the invention will be apparent from the following detailed description when taken in conjunction with the accompanying drawings.

SUMMARY OF THE INVENTION

The present invention achieves these and other objects by placing a separator barrier into the cell, metering a hot melt sealant into the cell so that the sealant flows under the separator barrier, pushing the separator barrier down, and seating the separator barrier into the hot melt. The end result is a sealed tube formed at the bottom of the cell.

The present invention eliminates the possibility of a short path 10 developing between the anode and the cathode via a space between the cell bottom and a plastic disk or ring that exists in prior art designs. Furthermore, the present invention greatly simplifies the manufacturing process, since the plastic disk is—eliminated—there is no need to form or place the disk 9 or ring in the bottom of the cell and there is no longer any requirement to spin the cell during hot melt metering.

DETAILED DESCRIPTION OF THE PREFERRED EMBODIMENT

Figure 1:
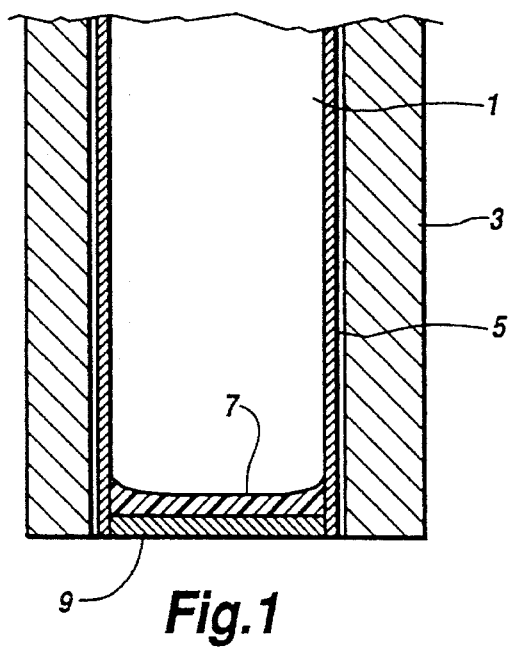
FIG. 1 depicts a prior art cell design in cross section.
Figure 2:
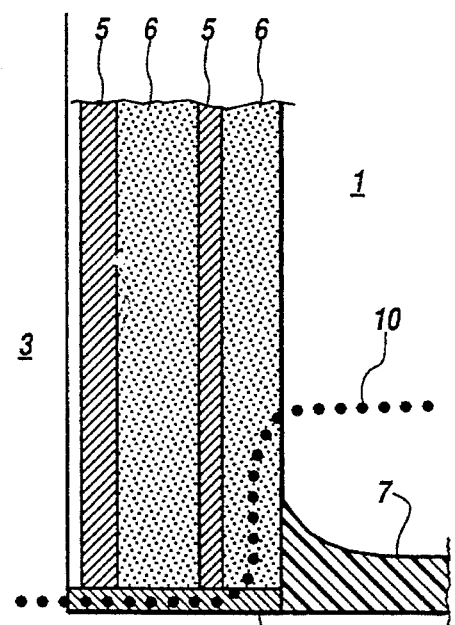
FIG. 2 depicts the short path in the prior art cell depicted in FIG. 1.
Figure 3:
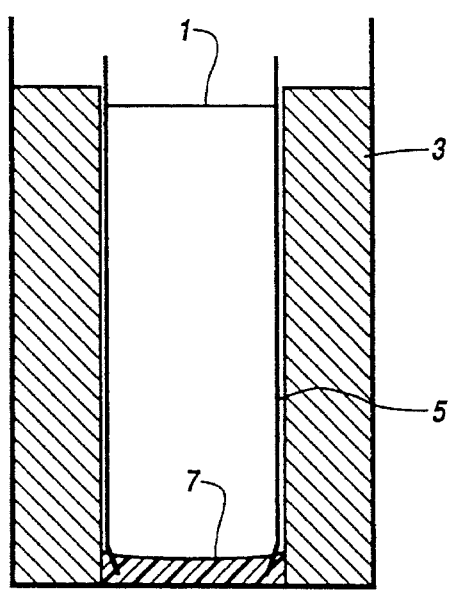
FIG. 3 illustrates a cell design of the present invention shown in cross section.
Figure 5:
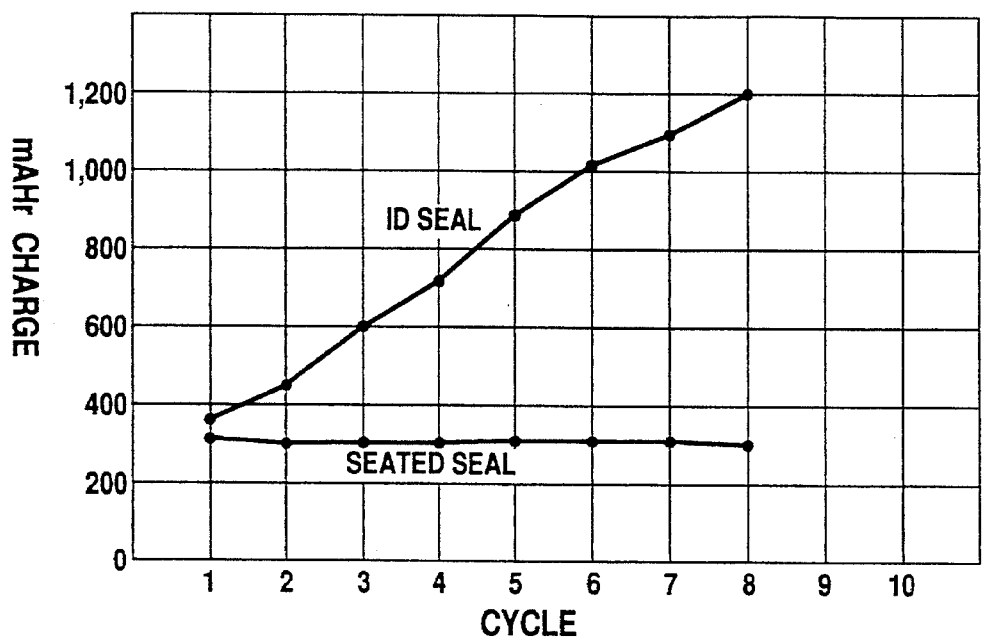
FIG. 5 depicts test results of the amount of charge required to recharge a cell for several charge/discharge cycles when the cell was discharged by 300 mAHr, for a cell constructed according to the present invention and a cell constructed according to FIG. 1.
Figure 6:
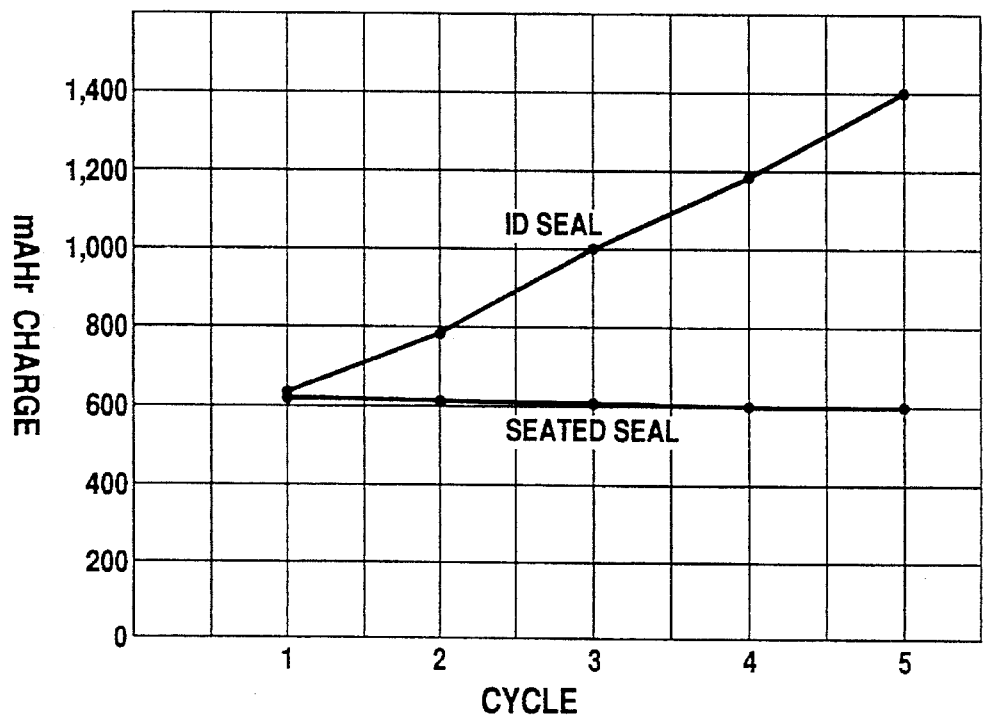
FIG. 6 depicts test results of the amount of charge required to recharge a cell for several charge/discharge cycles when the cell was discharged by 600 mAHr, for a cell constructed according to the present invention and a cell constructed according to FIG. 1.
Figure 7:
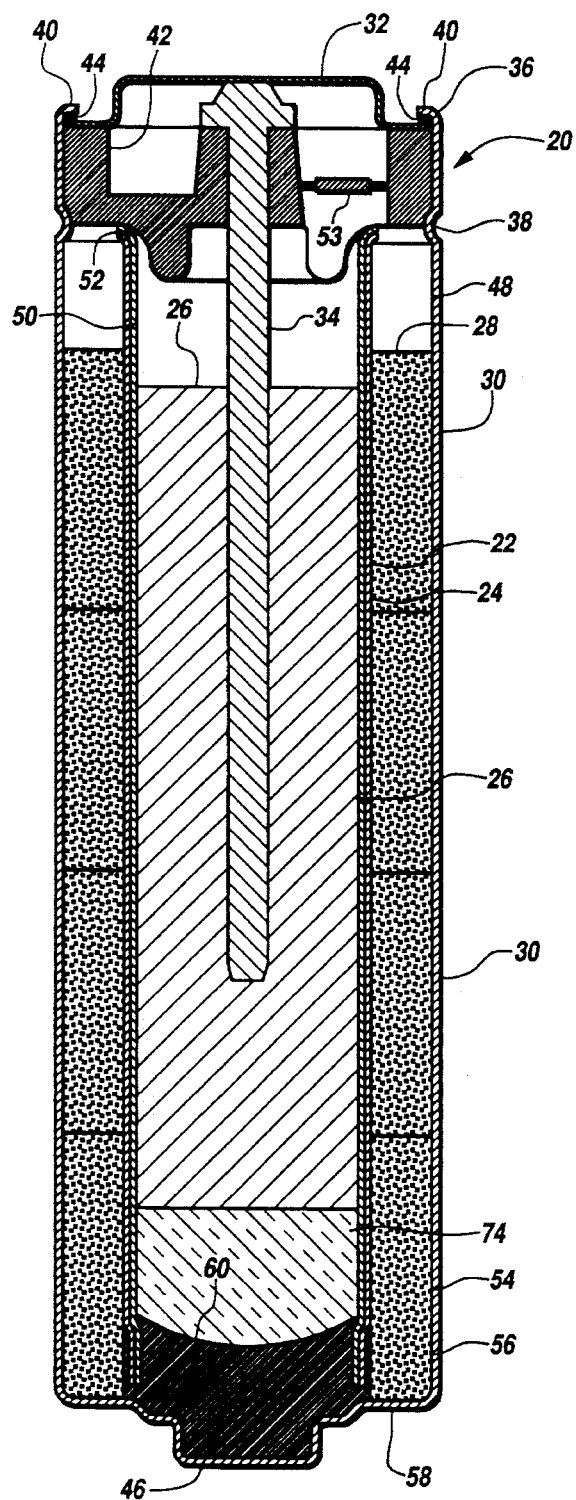
FIG. 7 is a cross sectional view of a cell employing the concept illustrated in FIG. 3.
Figure 9:
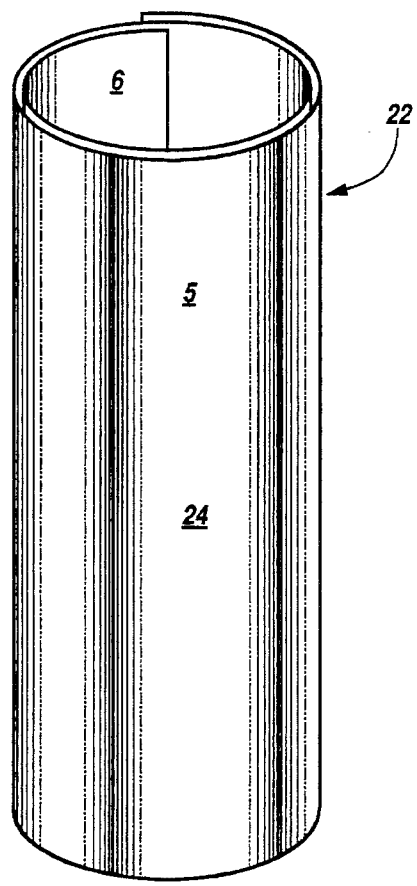
FIG. 9 is a isometric view of the convolute separator employed by the cell of FIG. 7.

Referring more particularly to FIGS. 1–9, wherein like numbers refer to similar pans, a rechargeable cell 20 of the present invention is shown in FIG. 7 and is depicted schematically in FIG. 3. The anode 1 is separated from the cathode 3 by the separator barrier 5 having an absorbent layer 6. The separator barrier 5 having an absorbent layer 6 is formed by winding material from a first roll of separator material together with material from a second roll of absorbent material onto a cylindrical mandrel of appropriate diameter such that both the absorbent material and the separator material are wound twice around the mandrel, thereby forming a convolute separator barrier 22 as shown in FIG. 9. The separator barrier and the absorbent are wound two and one eighth times around together in convolute fashion so that the outside diameter of the cylindrically shaped separator barrier is less than the inner diameter of the cathode. This allows the separator barrier to be easily inserted into the central cavity during manufacturing. During and after the manufacturing process, the convolute separator barrier tends to unravel and push against the inner cathode wall, which ensures that the electrolyte functions properly since the electrolyte engages contact with the anode and cathode. It is to be understood that other types of separator barriers having absorbent layers or absorbent properties are contemplated in the present invention, which is not confined to separator barriers of the convolute type.

The separator barrier 5 is then placed into the cell about approximately 1/8 inch from the bottom of the cell. A hot melt type sealant 7 is then metered directly onto the bottom of the cell. In this step, hot melt type sealant No. 34/2771 manufactured by National Starch, Inc. of Bridgewater, N.J. is metered directly into the cell at a temperature of about 340° F. and at a pressure of about 200 p.s.i. The temperature range over which this sealant operates for the purposes described herein is between 300° F. and 370° F.

After a short delay, e.g., approximately one to ten seconds, which short delay depends on the viscosity and initial temperature of the hot melt sealant, while the sealant 7 is still in fluid form, the separator barrier 5 is pushed down and seated directly into the sealant 7, but does not engage the bottom of the cell. A continuous seal is forms around and under the separator barrier. A thermoplastic sealant barrier forms on both the outer circumference and the inner circumference of the separator barrier, as well as underneath the separator barrier. Thus, all short paths 10 existing in prior art designs are eliminated. It is to be understood that the length of the short delay will depend on the viscosity of the sealant used, and the temperature at which the sealant is metered into the cell, however, three to five seconds has also proved advantageous.

The reason for the short delay is that the hot melt sealant cools faster at the bottom of the cell and at the surface that touches the cathode than elsewhere. Thus, when one pushes the separator barrier down into the hot melt sealant, the separator barrier will not touch the bottom of the cell because the lowest layer of hot melt sealant has already solidified.

Figure 4:
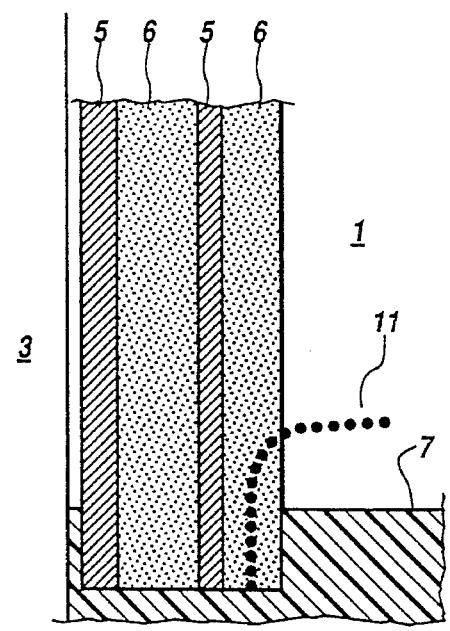
FIG. 4 depicts the blocking of the short path in the cell depicted in FIG. 3 according to the present invention.

As depicted in FIG. 2, for a cell constructed as shown in FIG. 1, with the sealant 7 applied only within the inner circumference of the separator barrier 5, anodic zinc can migrate into the porous absorbent layer 6 of the separator barrier and above the bottom disk reach the cathode. The present invention prevents this short path 11 from developing by ensuring that hot melt exists between the exterior and the interior surfaces of the separator barrier as well as underneath the separator barrier. As depicted in FIG. 4, the sealant blocks the migration of the anodic zinc to the cathode.

The present invention also prevents shorts from occurring at the edges or bottom of the separator barrier. Although the separator and absorbent are wound together, they do not perfectly overlie one another. Interstitial gaps occur at the edges of the bottom of the separator barrier. When the separator barrier is pushed down into the hot melt sealant, the hot melt sealant goes up into these interstitial gaps and fills them, thus preventing shorts from occurring at these interstitial voids.

The manufacturing of the rechargeable alkaline manganese cell is significantly improved by eliminating the bottom disk described in U.S. Pat. Nos. 5,108,852 and 5,272,020. No forming or placing of the disk is required, and them is no longer any requirement to spin the cell during hot melt metering; as was required in the prior art. Thus, the present invention removes the possibility of shorting between the cathode and anode that was present in prior art designs, yet simultaneously reduces the complexity of the manufacturing process. Cost of manufacture is reduced by eliminating both an element and the time required to place that element.

To determine the effectiveness of the short protection provided by batteries constructed according to the present invention as compared to batteries constructed according to the design illustrated in FIG. 1, cells of both designs were discharged by 300 mAhr and 600 mAhr. After being discharged by the requisite amount, the batteries were taken off load for four hours to allow shorts to develop. The batteries were then recharged for ten hours. If batteries do not have shorts between their electrodes, the charge necessary to recharge should be equal to the charge removed during discharge.

FIGS. 5 and 6 show the results of these discharge tests. Cells constructed according to the present invention (denoted as seated seal in FIGS. 5 and 6) required approximately the same charge as that removed during discharge, i.e., they exhibited no shorting after eight cycles when discharged by 300 mAHr, and after five cycles when discharged by 600 mAHr. In contrast, cells, constructed according to FIG. 1 (denoted as ID seal in FIGS. 5 and 6) required significantly more charge than that removed during discharge under both discharge conditions, even after a few charge/discharge cycles, i.e., they exhibited evidence of significant shorting after very few cycles. For example, after only eight charge discharge cycles, the cells constructed according to FIG. 1, required over four times the amount of charge than that removed during discharge, i.e., 1,200 mAHr were required to charge the cell when it had been discharged by 300 mAHr. Thus, cells constructed according to the present invention do not contain the shorts that develop in cells constructed according to the designed depicted in FIG. 1.

Figure 8:
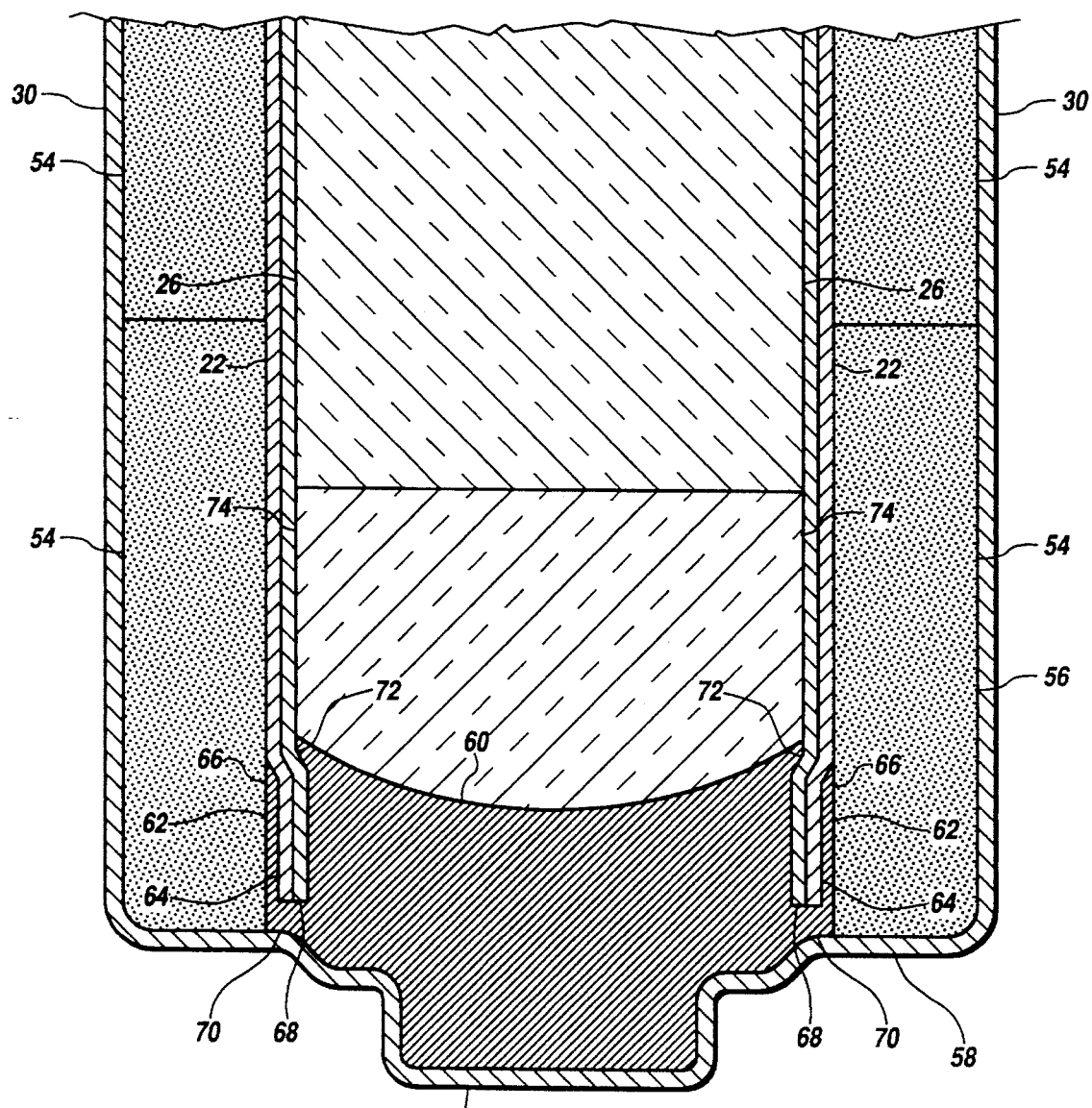
FIG. 8 is an enlarged view of a portion of FIG. 7.

Referring more particularly to FIGS. 7, 8, and 9, an exemplary battery 20 is shown in FIG. 7. The Battery 20 employs a convoluted separation barrier 22 shown by itself in FIG. 9. The convoluted barter 22 is formed of two layers, one of cellophane, forming a separator barrier 5, and the other a non-woven absorbent layer 6 as shown in FIG. 4. As shown in FIG. 9, the two-layer barrier material 24 is wrapped two and one-eighth times around to form the convoluted barrier 22.

As shown in FIG. 7, the convoluted barrier 22 separates the anode gell 26 from the cathode mix 28 and is centered within the steel can 30 of the battery 20. The top, or negative end 32 of the battery 20, is welded to the anode nail 34. The anode nail 34 penetrates the anode gel 26 and provides an electrical connection to the anode. The upper end 36 of the can 30 has a crimp 38 and a upper lip 40 which positions a plastic top 42 therebetween, the top 42 forming a gas-tight seal with the can. A plastic spacer 44 of eight to ten thousands thickness is positioned between the negative electrode 32 and the can lip 40 to prevent the shorting of the negative electrode 32 with the can 20 which forms the positive electrode 46. The separation barrier 22 and the can 30 form a void space 48 over the cathode mix 28.

The spacer 44 has a passage that allows the escape of gas through the spacer 44. Similarly the separation barrier 22 and the plastic top 42 define a void space 50 over the anode 26. Gas can migrate between the cathode void 48 and the anode void 50. Gas can also migrate between the plastic top 42 and the upper end 52 of the separation barrier 22. Under normal operating conditions the gases generated by the battery 20 and contained within the voids 48, 50 are recycled as the battery goes through charge and discharge cycles. However, if the battery is subject to abusive condition, excessive gas pressures can develop, in which case a safety valve or burst disc 5344 allows the gas to escape by passing through the plastic top 42 and exiting through passage ways in the spacer 44.

In assembling the battery, formed cylindrical rings 54 of the cathode mix 28 are positioned within the can 30, and in particular, the lowermost cathode segment 56 is placed on to the bottom 58 of the can 30. As shown in FIG. 7, and as shown enlarged in FIG. 8, hot melt glue 60 is placed on the bottom 58 of the can 30 in an amount sufficient to fill the space between the lowest anode segment 56 to a height of about one-eighth of an inch. The hot melt glue 60 is allowed to momentarily cool in contact with the inner surface 62 of the lowermost cathode segment 56 and against the bottom 56 of the can 30.

The hot melt glue 60 hardens in contact with the cool cathode segment 56 and the can bottom 58 which forms a barrier adjacent to the inner surface 62 of the cathode segment 56 and between the bottom 58. Thus, when the convoluted separator barrier 22 which has previously been positioned within the can 30 on the inside of the cathode segments 54 is slid towards the bottom 58 of the can 30, a lowermost portion 64 of the barrier 22 is forced inwardly over a cylindrical sleeve 66 of solidified hot melt glue. The lower end 68 comes to rest on a barrier of hot melt glue 70 which is adjacent to the can bottom 58. Thus, the convoluted barrier 22 is positioned, held, and sealed in a unitary quantity of solidified hot melt glue 60.

The barrier 22 is positioned without the need for any ring or plastic disc positioned at the bottom of the battery. Any of the dendrites which try to force their way through the separator 22 or around the separator 22 must follow a path considerably longer than in prior art batteries. The longer path for the growth of dendrites results in longer battery life and greater value to the consumer. By eliminating the washer considerable cost is saved. A washer or plastic disc must be precisely placed within the battery. Thus, the elimination of the plastic disc or ring removes an item of inventory and a process step, both of which contribute to the reduction of cost of the battery 20.

As shown in FIG. 8, the cylindrical sleeve of glue 66 crimps the lower portion of the barrier 22, forming a frustoconical crimp 72. This frustoconical crimp 72 is present in some in prior art batteries, but in prior art batteries it is the result of a metal can or sleeve and is not the result of a a sleeve formed in place that forms part of a unitary seal of solidified hot melt glue 60.

The battery is completed by placing a quantity of gelled electrolyte 74 adjacent to the hot melt glue and underlying the anode gel 26. The convoluted separator barrier 22 has its inside non-woven absorbent layer 6 in contact with the anode 26. The absorbent material is saturated with an initial quantity of electrolyte with additional electrolyte being provided over the life of the rechargeable battery from the gelled electrolyte 74.

The anode gel 26 is then added. The plastic top 42 is then positioned on the crimp 38. The anode nail is then inserted into the anode. The negative electrode is positioned over the nail 38. An insulating spacer 44 is placed between the negative electrode. The battery can lip 40 is then formed down over the spacer 44 holding the negative electrode 32 and the top 42 in place. Finally, the nail 34 is welded to the negative electrode 32.

Figure 10:
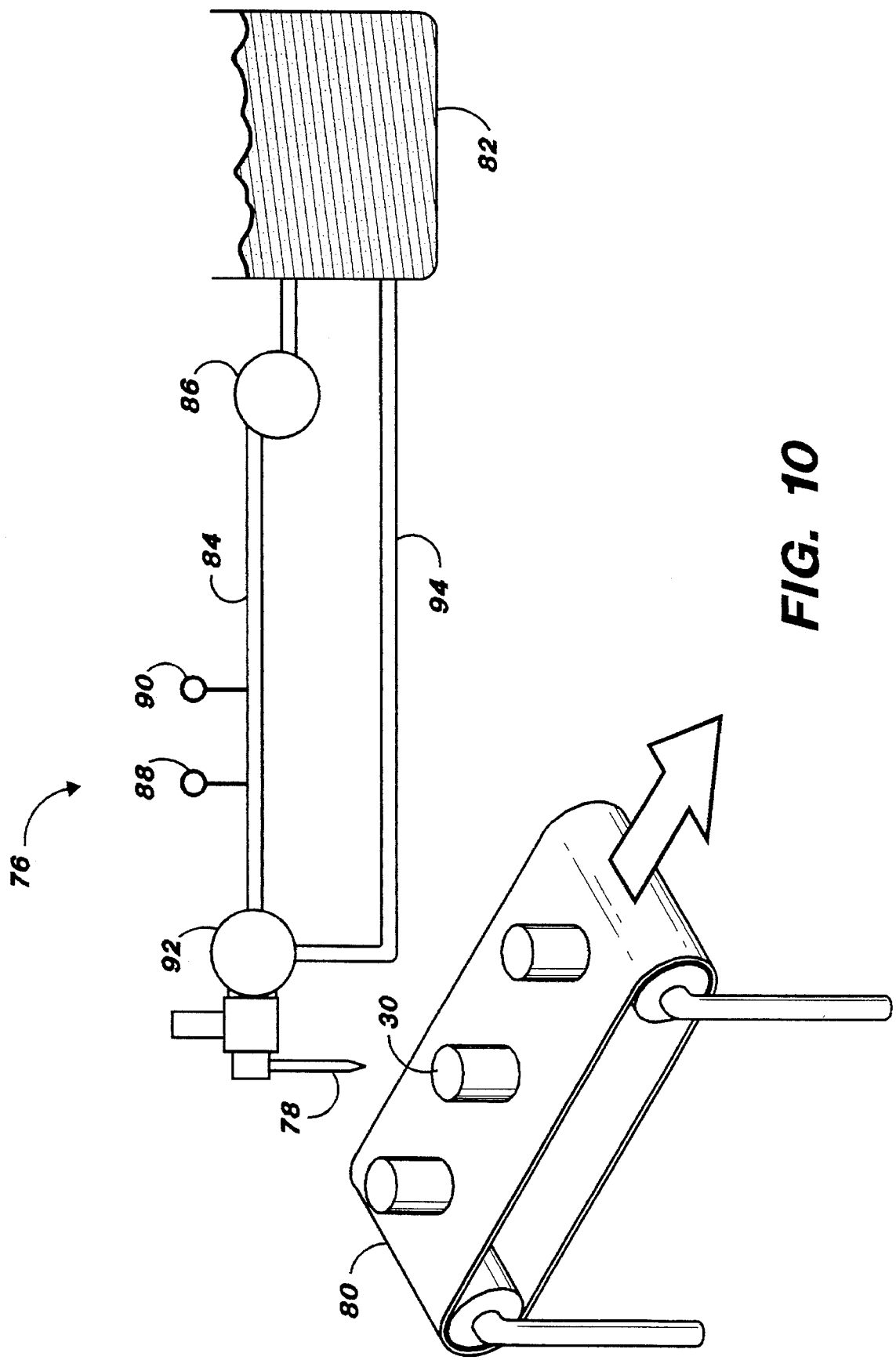
FIG. 10 is a schematic view of an apparatus for dispensing hot melt glue to form the battery of this invention.

In the production of batteries of the present invention, it is of course desirable to maintain the quantity of hot melt glue dispensed into each battery can between upper and lower specification limits. An apparatus 76 for dispensing hot melt glue in production lines which may be subject to intermittent operation is shown schematically in FIG. 10.

The battery cans 30 are conveyed beneath the hot melt dispensing head 78 of the apparatus 76 by a transport machine 80. Assuming the temperature of the hot melt glue is maintained by temperature controllers, by controlling the delivery pressure the weight of glue dispensed may also be controlled.

The glue is heated to a liquid state in a glue melt tank 82 and during normal operation is pumped through a hose 84 by a glue pump 86. The pump 86 is provided with a mechanism which will unload glue directly into the melt tank 82 if the glue pressure exceeds acceptable levels. The glue hose 84, and the return line 94 are heated to retain the glue in a liquid state at all times. Two pressure switches 88, 90 are positioned in the hose 84 as the glue reaches the dispensing head 78. At startup, the pump 86 is activated to begin pumping hot melt glue from the melt tank 82. A pressure switch 88 determines whether the glue pressure is at nominal operating levels. When the pressure in the hose 84 at the dispensing head reaches nominal levels, the pressure switch 88 activates the transport machine 80. Activation of the transport machine 80 initiates the dispense cycle and causes the dispensing head to begin to dispense hot melt glue into the battery cans advanced by the transport machine 80.

However, if the pressure in the hose 84 is less than an acceptable level, the low pressure switch 90 halts the transport machine 80 and hence the operation of the dispensing head 78 is also halted. A diverter valve 92 is positioned ahead of the dispensing head 78, and when the pressure is lower that operating levels, is configured to divert the flow of hot melt glue from the dispensing head back through a return line 94 to the melt tank 82. The pressure switch 88 closes the diverter valve 92 to halt the return of hot melt glue to the melt tank when pressures reach acceptable levels.

When it is desired to halt the apparatus 76, the transport machine 80 is stopped. The transport machine is connected to cause the diverter valve 92 to open when it is stopped. The pump 86 is operated for a short time to purge the return line 94 and then stops.

The apparatus 76 ensures that hot melt is dispensed only within desired pressure levels, thus ensuring an acceptable quantity of hot melt dispensed into each battery can 30.

While the invention has been described with reference to specific embodiments, it will be apparent to those skilled in the art that many modifications and variations may be made. Accordingly, the present invention is intended to embrace all such alternatives, modifications and variations that may fall within the spirit and scope of the appended claims and equivalents thereof.

We claim:

1. A rechargeable alkaline manganese dioxide round cell, comprising:

(a) a cylindrical metal container comprising a closed first end forming a bottom, an initially open second end, and upstanding sidewalls, the bottom and upstanding sidewalls having inner surfaces, the container forming a positive current collector;

(b) a cylindrically-shaped annular cathode disposed within the container and comprising manganese dioxide, the cathode having outer and inner peripheral sidewalls, the outer peripheral sidewalls being disposed propinquant to the inner surface of the upstanding sidewalls, the inner peripheral sidewalls forming a central cylindrically shaped void, the bottommost portion of the void forming a space;

(c) a cylindrically-shaped anode having outer peripheral sidewalls and comprising gelled zinc, the anode being disposed within the void;

(d) a cylindrically-shaped separator having a bottom edge, an inner sidewall, and an outer sidewall, the separator being disposed between the outer peripheral sidewalls of the anode and the inner peripheral sidewalls of the cathode, the bottom edge being disposed within the space; and (e) a hot melt barrier disposed in the bottom of the container and completely occupying the space, the barrier engaging and surrounding completely the bottom edge and portions of the inner and outer separator sidewalls propinquant to the bottom edge, the barrier forming a seal for inhibiting the occurrence of electrical shorts between the anode and the cathode, the barrier comprising an undifferentiated, substantially homogeneous solid hot melt material at room temperature, the hot melt material being an undifferentiated, substantially homogenous, form-fitting liquid at temperatures exceeding its melting temperature.

2. The cell of claim 1, wherein the bottom edge is propinquant to the inner surface of the bottom of the container.

3. The cell of claim 1, wherein the separator comprises at least one absorbent layer.

4. The cell of claim 1, wherein the separator is convoluted, and has a plurality of layers, with interstitial gaps being defined between the bottom edges of the separator layers and the hot melt sealant barrier filling at least a portion of the gaps.

5. The cell of claim 1, wherein the bottom edge of the separator extends radially inwardly within the hot melt barrier.

\* \* \* \* \*